United States Patent [19]

Walters

[11] 3,979,356
[45] Sept. 7, 1976

[54] POLYMERIC COMPOSITION AND INSULATED PRODUCTS

[75] Inventor: Robert B. Walters, Oxford, Conn.

[73] Assignee: General Electric Company, New York, N.Y.

[22] Filed: May 21, 1975

[21] Appl. No.: 579,389

Related U.S. Application Data

[62] Division of Ser. No. 390,618, May 30, 1972, Pat. No. 3,900,681.

[52] U.S. Cl. .......................... 260/42.26; 260/42.15; 260/45.7 R; 260/827; 428/379
[51] Int. Cl.² ......................................... C08K 3/12
[58] Field of Search ............. 260/42.26; 260/45.7 R, 260/827

[56] References Cited
UNITED STATES PATENTS

| | | | |
|---|---|---|---|
| 2,888,419 | 5/1959 | Safford | 260/42.26 |
| 2,888,424 | 5/1959 | Precopio et al. | 260/827 |
| 3,563,939 | 2/1971 | Stevens | 260/37 SB |
| 3,773,556 | 11/1973 | Rowland | 428/379 |
| 3,832,326 | 8/1974 | North et al. | 260/42.29 |

Primary Examiner—James H. Derrington
Attorney, Agent, or Firm—R. G. Simkins; P. L. Schlamp; F. L. Neuhauser

[57] ABSTRACT

Cured polymeric compositions having increased resistance to flow and dripping at flame temperatures, comprising copolymers of ethylene-vinyl acetate, hydrated alumina, and silicone elastomer; and electrical conductors insulated therewith.

15 Claims, 1 Drawing Figure

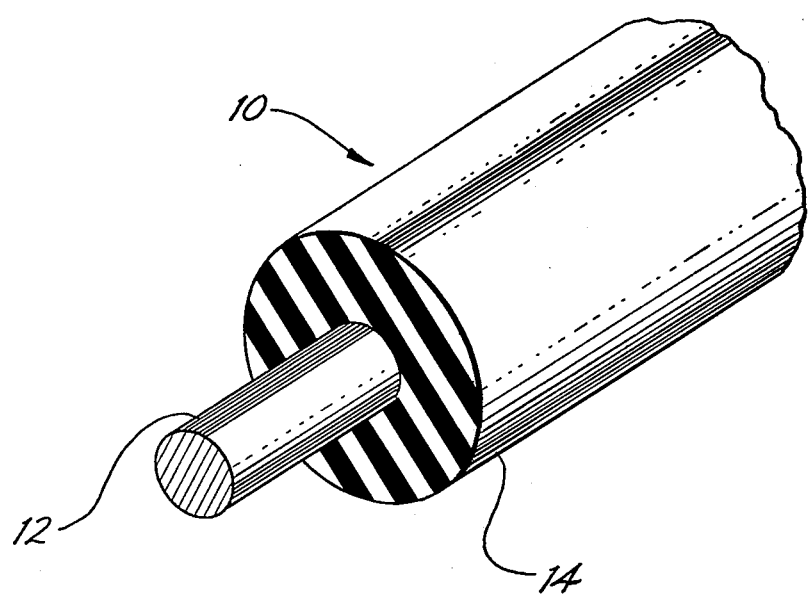

POLYMERIC COMPOSITION AND INSULATED PRODUCTS

This is a division of application Ser. No. 390,618, filed May 30, 1972, now U.S. Pat. No. 3,900,681, issued Aug. 19, 1975.

BACKGROUND OF THE INVENTION

Organic polymeric compositions, such as polyolefins and elastomers, which are commonly utilized as dielectric insulating materials for electrical wires and other conductors, comprise materials which are typically very susceptible to a loss of physical form or structural integrity when subjected to flame or combustion temperatures. The loss of physical form or structural integrity in these polymeric compositions at the temperatures of flame or burning conditions is normally accompanied by the flow and dripping of their combustible components which can be an especially hazardous source of material for the spreading of flame and fire.

This source of flame and fire propagation due to flowing and dripping of combustible organic electrical insulating materials is particularly critical in locations within and about motors and machinery because of the general presence or close proximity of oils and other highly combustible lubricants and materials which can, in turn, further propagate and expand the fire hazard and its spread.

SUMMARY OF THE INVENTION

This invention comprises a polymeric composition having dielectric properties whereby it is effectively adapted for service as an electrical insulation for electrical wire and cable, and other conductors, and which exhibits a high degree of resistance to a loss of physical integrity or to flow and dripping at flame or combustion temperatures. The polymeric composition of this invention comprises a combination of ingredients, including ethylene-vinyl acetate copolymer, hydrated alumina, and silicone elastomer, and wherein the copolymer is cross link cured to a thermoset state by means of a free radical forming organic peroxide.

Electrical conductors insulated with the polymeric compositions of this invention are particularly suited for use as power lines or lead wires and wiring for electrical motors and machinery wherein they are especially useful and effective in inhibiting the spread of fire or combustion.

OBJECTS OF THE INVENTION

A primary object of this invention is to provide a polymeric composition having a high degree of resistance to flow and dripping at flame or combustion temperatures.

A further object of this invention is to provide an improved polymeric electrical insulation having suitable electrical properties and improved high temperature structural integrity and which resists flow and dripping on exposure to the temperatures of flame and combustion.

Another object of this invention is to provide electrical wire or cable and other conductors insulated with a novel polymeric composition of improved high temperature properties which reduces the hazard of fires and their propagation.

BRIEF DESCRIPTION OF THE DRAWING

The drawing comprises a perspective view illustrating an insulated conductor product manufactured according to this invention.

DETAILED DESCRIPTION OF A PREFERRED EMBODIMENT

This invention comprises a new polymeric composition composed of a specific combination of ingredients, and which provides distinctive and advantageous properties.

The polymeric composition of this invention essentially contains a copolymer of ethylene-vinyl acetate, hydrated alumina, and silicone elastomer, in the following relative proportions in parts by weight.

| Ingredients | Proportions | |
|---|---|---|
| | Broad | Preferred |
| Ethylene-vinyl acetate copolymer | 100 | 100 |
| Hydrated alumina | 25–150 | 50–125 |
| Silicone elastomer | 2–25 | 5–20 |

The ethylene-vinyl acetate for use in this invention comprises copolymers composed of about 70 to 95 parts by weight of ethylene and about 30 to 5 parts by weight of vinyl acetate, and typically about 80 parts of ethylene to about 20 parts of vinyl acetate.

The hydrated alumina, or alumina trihydrate ($Al_2O_3 \cdot H_2O$), is preferably included in relatively fine particle size of about 0.1 to 1 microns.

Silicone elastomers suitable for the polymeric composition of this invention includes organopolysiloxanes which have been condensed to a gummy elastic, substantially solid state with a Brookfield viscosity of at least one million centipoise, and preferably with a Brookfield viscosity in excess of about 8 million centipoise. For example a typical silicone elastomer for use in the composition of this invention is a class of dimethylpolysiloxanes having the chemical structure:

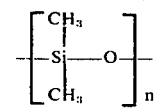

Another class of silicone elastomers for use in this invention is the methyl-phenyl polysiloxanes. Further examples of the type of silicone elastomer gums usable in obtaining the compositions of this invention comprise the organopolysiloxanes referred to in U.S. Pat. No. 2,888,419 and identified in detail in U.S. Pat. Nos. 2,448,756; 2,457,688; 2,484,595; 2,490,357; 2,521,528; and 2,541,137.

The polymeric compositions of this invention comprising a copolymer of polyethylene-ethylene vinyl acetate, are cross link cured to a thermoset state through the addition of a curing agent and heating the blend. Effectively usable curing agents comprise those materials which will effect a crosslinking cure of the ethylene containing copolymers, such as organic peroxides which decompose to provide free radicals upon exposure to increased temperatures. Tertiary organic peroxides such as dicumyl peroxide are preferred because their temperature levels for decomposition and incitement of the cross-linking curing are in a practical range for most manufacturing operations. Suitable peroxide curing systems for the ethylene-containing copolymer material of this invention are further described in U.S. Pat. Nos. 2,888,424; 3,079,370; 3,086,966; and 3,214,422. Specific tertiary diperoxides include 2,5-dimethyl-2,5 (t-butyl peroxy) hexane; 2,5-dimethyl-2,5 (t-butyl peroxy) hexyne-3; d,α-bis (t-butyl peroxy) diisopropylbenzene; and similar diperoxy compounds.

The ratio of peroxide curing agent to the ethylene-containing copolymer material depends upon the physical and chemical properties desired in the cured product, such as the degree of solvent resistance or hot tensile strength. Amounts of peroxide curing agent of from about 2 to 10 parts by weight of the ethylene-vinyl acetate copolymer satisfy most requirements, and typically proportions of about 3 to 8 parts by weight suffice for compositions for most electrical insulating services.

The polymeric compositions of this invention may include other ingredients, additives and agents, depending upon the intended service of the products thereof, and the required or desired properties. For example other components may comprise antioxidants, preservatives, lubricants, mold release agents, pigments or coloring agents, inorganic fillers, processing aids, waterproofing agents, coupling agents, etc.

The following comprise examples of preferred and typical polymeric compositions of this invention, and demonstrate their increased resistance to flow and dripping at flame or combustion temperatures. In the examples the proportions of the ingredients of each composition are given in relative parts by weight.

the drawing, an insulated product 10 comprises a metallic conductor 12, composed of a single strand as shown or a bundle of individual strands, having an overlying electrically insulating covering 14 of a polymeric composition according to the present invention and which is resistant to flow and dripping at flame temperatures.

As used in the claims and throughout this disclosure, the terms flame temperatures, or combustion temperatures, are to be understood to mean and define the temperature conditions at which oxidation takes place so rapidly that the products thereof are rendered incandescent.

Although the invention has been described with reference to certain specific embodiments thereof, numerous modifications are possible without departing from the present invention as herein disclosed and it is desired to cover all modifications falling within the spirit and scope of the invention.

What I claim as new and desire to secure by Letters Patent of the U.S. is:

1. A polymeric composition resistant to flow and dripping at flame temperatures, comprising the cross-link cured product of the following ingredients, in relative parts by weight: 100 parts of ethylene-vinyl acetate copolymer comprising about 70 to 95 parts by weight of ethylene and about 30 to 5 parts by weight of vinyl acetate; about 25 to 150 parts of hydrated alumina; about 2 to 25 parts of silicone elastomer having a viscosity in excess of about 1 million centipoise; and about 2 to 10 parts of an organo tertiary peroxide curing agent.

2. The cured polymeric composition of claim 1,

| Ingredients | Examples | | | | |
|---|---|---|---|---|---|
| | 1 | 2 | 3 | 4 | 5 |
| Ethylene-vinyl acetate copolymer (82 parts ethylene/18 parts vinyl acetate DQD-1868 Union Carbide) | 100 | 100* | 100 | 100 | 100 |
| Hydrated alumina | 100 | 100 | 50 | 50 | 25 |
| Silicone elastomer (General Electric CE-903 dimethylpolysiloxane**) | 6 | 6 | 5 | — | 5 |
| Dicumyl peroxide curing agent | 4.5 | 4.5 | 4.5 | 4.5 | 4.5 |
| Antioxidant - Agerite Resin D (polymerized 1.2 dihydro-2,2,4-trimethylquimoline) | 2 | 2 | 2 | 2 | 2 |
| Calcium stearate | 0.5 | 0.5 | — | — | — |
| Vinyl silane | 1 | 1 | 1.2 | 1.2 | 1.2 |

*copolymer of 91.5 parts of ethylene and 8.5 parts of vinyl acetate
**Mooney Plasticity (ML190°F 1 4) of 8-15

The ingredients of the compositions of each example were blended in a heated polymer compounding mixer, at temperatures ranging up to about 190°F with the peroxide curing agent being added last and the temperature of the ingredients thereafter maintained below the curing level to prevent scorching or precuring of the composition.

The compositions of each example were extruded on a 20 AWG copper wire conductor in a wall thickness of about 1/32 inch and cured by heating to a temperature of about 400°F for a period of about 0.6 minutes. Samples of each composition insulated wire were subjected to the UL Vertical Flame Test (UL83) to evaluate their dripping characteristics at flame temperature. The compositions of Examples 1, 2, 3 & 5 exhibited no dripping and the composition of Example 4 exhibited excessive dripping of flaming, molten insulation.

A typical insulated electrical conductor product of this invention is illustrated in the drawing. Referring to wherein the copolymer of ethylene-vinyl acetate comprises about 80 parts by weight of ethylene and about 20 parts by weight of vinyl acetate.

3. The cured polymeric composition of claim 2, wherein the silicone elastomer has a viscosity in excess of about 8 million centipoise.

4. The cured polymeric composition of claim 3, wherein the silicone elastomer is dimethylpolysiloxane.

5. The cured polymeric composition of claim 3, wherein the silicone elastomer is methyl-phenyl polysiloxane.

6. The cured polymeric composition of claim 2, comprising about 0.5 to 3.0 parts by weight of vinyl silane.

7. A polymeric composition resistant to flow and dripping at flame temperatures, comprising the cross-link cured product of the following ingredients, in relative parts by weight: 100 parts of ethylene-vinyl acetate copolymer comprising about 70 to 95 parts by weight of ethylene and about 30 to 5 parts by weight of vinyl acetate; about 50 to 150 parts of hydrated alumina, about 5 to 20 parts of silicone elastomer having a viscosity of at least one million centipoise, and about 3 to 8 parts of an organo tertiary peroxide curing agent.

8. The cured polymeric composition of claim 7, wherein the silicone elastomer is a dimethylpolysiloxane having the chemical structure:

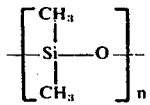

9. The cured polymeric composition of claim 7, wherein the silicone elastomer is methyl-phenyl polysiloxane.

10. A polymeric composition resistant to flow and dripping at flame temperatures, comprising the crosslink cured product of the following ingredients, in approximate relative parts by weight: 100 parts of ethylene-vinyl acetate copolymer comprising about 82 parts by weight of ethylene and about 18 parts by weight of vinyl acetate; about 100 parts of hydrated alumina; about 6 parts of dimethylpolysiloxane silicone elastomer having a viscosity of at least about 1 million centipoise; and about 4.5 parts of organo tertiary peroxide curing agent.

11. A polymeric composition curable to a thermoset state wherein it is resistant to flow and dripping at flame temperatures comprising, in relative parts by weight: 100 parts of ethylene-vinyl acetate copolymer comprising about 70 to about 95 parts by weight of ethylene and about 30 to about 5 parts by weight of vinyl acetate; about 25 to 150 parts of hydrated alumina; about 2 to 25 parts of silicone elastomer having a viscosity in excess of about 8 million centipoise; and about 2 to 10 parts of an organo tertiary peroxide curing agent.

12. The curable polymeric composition of claim 11, wherein copolymer of ethylene-vinyl acetate comprises about 80 parts by weight of ethylene and about 20 parts by weight of vinyl acetate.

13. The curable polymeric composition of claim 12, wherein the silicone elastomer is present in amount of about 5 to about 20 parts by weight.

14. The curable polymeric composition of claim 13, wherein the silicone elastomer is dimethylpolysiloxane.

15. The curable polymeric composition of claim 13, wherein the silicone elastomer is methyl-phenyl polysiloxane.

* * * * *